US005357706A

United States Patent [19]
Berg

[11] Patent Number: 5,357,706
[45] Date of Patent: Oct. 25, 1994

[54] ARRANGEMENT FOR UNHOOKING SNELL IN AUTOMATIC LONGLINE-HANDLING MACHINE

[76] Inventor: Thor Berg, Ovrebakken 10, N-8613, Selfors, Norway

[21] Appl. No.: 974,571
[22] PCT Filed: Jun. 12, 1991
[86] PCT No.: PCT/NO91/00084
  § 371 Date: Feb. 22, 1993
  § 102(e) Date: Feb. 22, 1993
[87] PCT Pub. No.: WO92/00007
  PCT Pub. Date: Jan. 9, 1992

[30] Foreign Application Priority Data
  Jun. 22, 1990 [NO] Norway .................... 902806
[51] Int. Cl.⁵ .............................................. A01K 83/00
[52] U.S. Cl. ................................................ 43/4
[58] Field of Search .......... 43/4, 4.5, 6.5, 27.4, 43/44.83, 44.86, 44.92

[56] References Cited
U.S. PATENT DOCUMENTS
4,277,905 7/1981 Huse ............................ 43/4
4,566,215 1/1986 Björshol ...................... 43/4

FOREIGN PATENT DOCUMENTS
154711   9/1986 Norway .
296543   3/1972 U.S.S.R. ..................... 43/43.1
2035021  6/1980 United Kingdom .
8400469  2/1984 World Int. Prop. O. .

Primary Examiner—Kurt C. Rowan
Attorney, Agent, or Firm—Birch, Stewart, Kolasch & Birch

[57] ABSTRACT

An arrangement for unhooking snell in an automatic longline handling machine includes an elongated guide portion, and a longitudinal and circular track formed in the guide portion, the track having a rectangular opening provided therein. The track feeds a main line. At least one swivel member, each having an eye opening for connecting to respective hooks and snells is positioned such that the eyes run in the opening. A snell follower, first affected by the eye running in the opening, further controls an unhooking bar for separating the at least one swivel member from a respective hook. A speed bar with a torsion spring unlocks a strained hook kicker which guides the separated hook into a hook store.

9 Claims, 3 Drawing Sheets

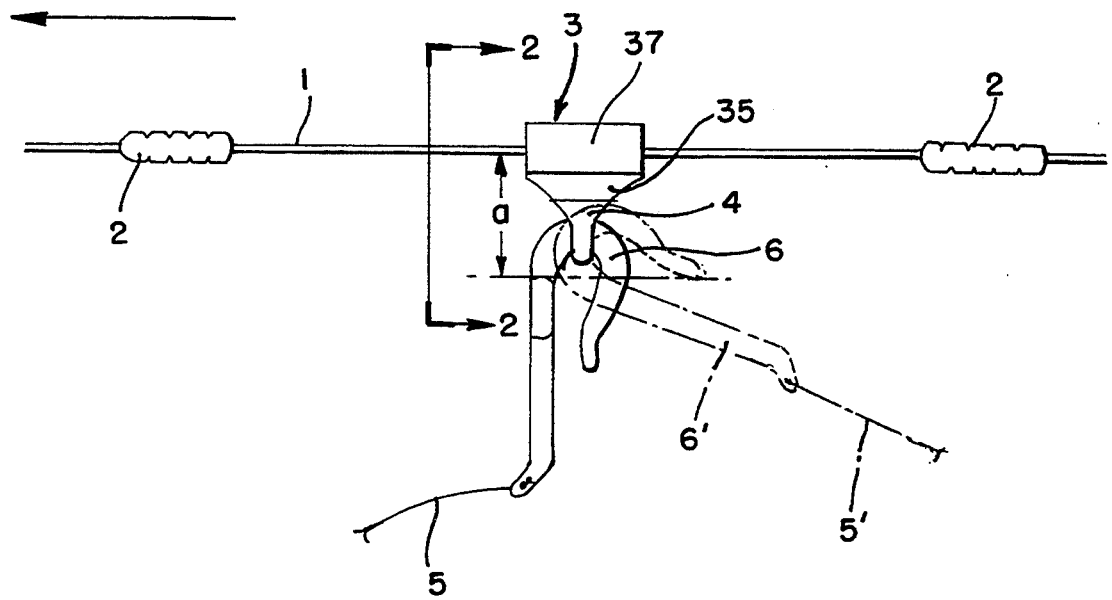
FIG. 1
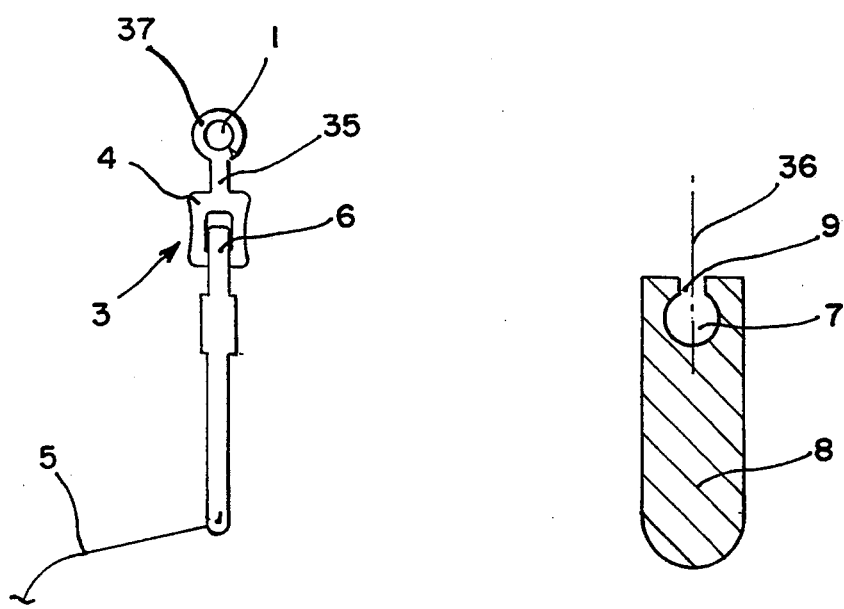
FIG. 2  FIG. 5

5,357,706

ARRANGEMENT FOR UNHOOKING SNELL IN AUTOMATIC LONGLINE-HANDLING MACHINE

BACKGROUND OF THE INVENTION

1. Field of the Invention

The invention is an apparatus for unhooking releasable snells from a main line when working with an automatic longline-handling machine. The apparatus will detach snell from a main line during hauling for separate storage of the main line and snell. The snell and main line are separated because it is suitable to store them in different places and easy to replace damaged snells with new ones.

2. Description of Related Art

When catching fish, different types of tools are used, which can be divided into two main groups. One group comprises catching where different kind of nets, such as a fishing net and trawl are used. The other group of catching tools comprises those where hooks are used. Further, one type of these are longlines with a main line and in suitable distances along this snells, which can be hooked on and can be unhooked.

SUMMARY OF THE INVENTION

The snell is attached at right angles to the main line by a swivel which makes it possible to rotate around its own lengthwise axis. This makes the snell and hook rotatable around the lengthwise axis of the main line. The connection between snell and swivel may either be cut off or may be hooked on to the main line and can be unhooked by hand or by machine.

The hook/swivel-equipment which this invention is working with, is shown in FIG. 1. A swivel 3 consists of a cylindric part 37 which is free to move between two stoppers 2 which further are permanently attached to the main line 1 at a predetermined distance from each other. On the middle of the cylindric part of the swivel, an eye 4 is attached to a partly S-shaped hook 6 which is further connected to the snell. This hooking equipment prevents the snell from rotating around its own length axis. The snell is hooked off/on to the main line by hand.

The intention of the invention is to unhook the snell in a very short time and in a secured manner.

This is achieved by use of an unhooking bar which to its end is attached a needle which carries out the unhooking operation and is controlled by the running swivel. The needle keeps the unhooked S-shaped hooks a short while after they have been released from the main line. An arm shaped like a foot, kicks the hook into a store consisting of a rod.

BRIEF DESCRIPTION OF THE DRAWINGS

Further details according to the invention will appear throughout the claims and the following description of an embodiment, with references to the accompanying drawings.

FIG. 1 shows the unhooking equipment between the main line and the snell which this invention is based on;

FIG. 2 is a section along line II—II in FIG. 1;

FIG. 5 is a cross-section along line V—V in FIG. 3 through a guide rail. This is the last part of the unhooking operation.

DETAILED DESCRIPTION OF PREFERRED EMBODIMENTS

Figure 3:
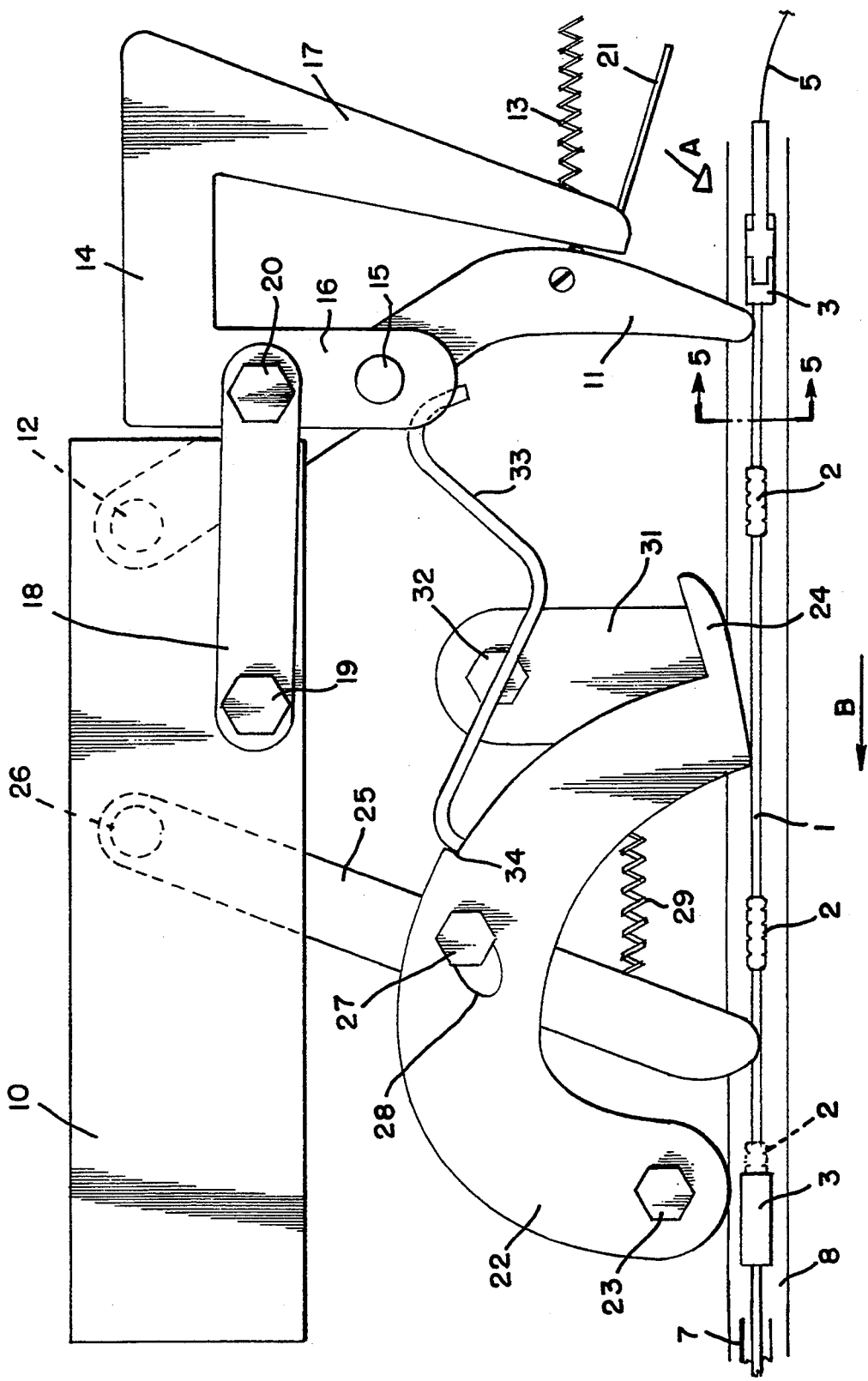
FIG. 3 shows the unhooking unit when the swivel is in the first part of the unhooking operation where the swivel is in the process of coming into engagement with a component of the unhooking device.

The arrangement for attaching the snell 5 to the main line 1, is viewed in FIG. 1. On the main line 1 at a suitable distance from each other two stoppers 2 are arranged. In between these a swivel 3 is free to run. The swivel 3 consists of a cylindric part whereto the middle of its peripheral an eye 4 is situated. The main plane of the eye 4 is at right angles to the length axis of the main line 1, but this length axis does not fall into this plane. They are at right angles to each other. The opening of the eye 4 has a rectangular shape. The swivel also includes a cylindrical sleeve section 37 which is permanently connected to the eye 4 via a neck section 35.

The snell 5 is attached to the hook 6 of which one end is attached to the snell 5 and the other to a part shaped like half of an S. This we usually call a hook shape. The cross-section of the hook 6 is also rectangular to suit the eye 4. The hook 6 may be difficult to move out of a plane falling together with the length axis of the main line 1 without moving the swivel 3 by rotating it around the main line 1. How the unhooking unit is built up is shown in FIG. 3. The main line 1 is coming into the figure from the left in a track 7 formed in a guide 8. The track 7 has a circular cross-section, but has an opening 9 along which the eye 4 and the hook 6 are able to run outside the guide 8 as shown in FIG. 5.

The unhooking unit is built around this guide 8 and parallel thereto in a horizontal plane arranged to a beam 10. A swivel follower 11 is rotatably hung from the beam 10 by a first pivot 12 on that end of the beam 10 which is nearest to the direction wherefrom the main line 1 is coming when hauled. The swivel follower 11 consists nearest to the beam 10 in ⅔ of its total length of a right-lined part. The last ⅓ part of the swivel follower 11 is also a right-lined part and these two parts have in between each other an angle of about 45° in a direction from where the main line 1 is coming. The end of the swivel follower 11 opposite of that hung from the beam 10, lies against the side of the guide 8 where the track 9 is, because when the main line 1 is moving along the guide 8 and when the swivel 3 comes, it will reach the swivel follower 11 and move it. A first retracting spring 13 is in its one end connected to the swivel follower 11 at the spot where it has a sharp turn and the second end is connected in such direction that the first retracting spring 13 is stretched when a swivel 3 is moving the swivel follower 11. The first retracting spring 13 will return the swivel follower 11 to a start position in FIG. 3 when the swivel 3 lets it go.

About in the middle of the swivel follower 11, it is connected to an unhooking arm 38. The connection is rotatable around a second pivot 15. The unhooking arm 38 will have its movement in a vertical plane. The shape of the unhooking arm is near to a rectangle where one of the shortest sides is removed and one of the longest sides is first part 16 which is about ⅔ of the length of the parallel second part 17. A third part 14 is at right angles to the first part 16 at its end longest from the second pivot 15 and is connected to the second part 17 in one end with an angle in between which is a bit less than 90°, so the three parts of the unhooking arm 38 together make a shape similar to an inverted U with an unlike length of its vertical parts. The inverted U-shaped unhooking arm is initially directed with its opening against the guide 8.

The unhooking arm 38 is connected to the swivel follower 11 by the second pivot 15 which is arranged to the free end of the first part 16.

A speed bar 18 is rotatable about its one end connected to the beam 10 through a third pivot 19, and which is connected to the beam 10 farther from the first retracting spring 13 than the connection between the swivel follower 11 and the beam 10. The other end of the speed bar 18, is by means of a fourth pivot 20 rotatably arranged to the first part 16. The spot where the speed bar 18 is connected is about on the middle of the first part 16. This functions in such a way that when the swivel follower 11 moves towards the left in the figure, the unhooking arm 38 will rotate around the second pivot 15 with a higher speed than the swivel follower 11 because of the speed bar 18 and the arranged spot of the fourth pivot 20 to the unhooking arm 38.

Approximately in right angles to the free end of the unhooking arm 38 and in the same vertical plane as it moves, a rod-shaped hook holder 21 is arranged. It is arranged to the first part 16 in a direction from the beam 10. The length of the hook holder 21 is long enough that when the unhooking arm 38 moves down beside the guide 8 and the track 9, it clasps the hook 6 out of the eye 4.

From the swivel follower 11 in the direction which the main line 1 is moving, there are two more bars. One of them is a half-circle hook kicker 22, which is rotatably arranged to one side of the guide 8 by a fifth pivot 23. In the other end of the hook kicker 22 nearest to the swivel follower 11, there is a kick foot 24. The kick foot 24 is directed out from the periphery and on the prolongation of a radius of the half-circle.

A kick controller 25 is rotatably connected to the beam 10 by a sixth pivot 26. This is situated the same distance from the guide 8 as the first pivot 12 and so that the third pivot 19 is situated horizontally between the swivel follower 11 and the sixth pivot 26.

The kick controller 25 is directed down beside the hook kicker 22 and the track 9. A control pig 27 is arranged at right angles to the same side of the kick controller 25 where the hook kicker 22 is and about ⅓ of the total length of the kick controller 25 from its free end. The control pig 27 runs in a control track 28 in the hook kicker 22. The control track 28 is directed at an angle of about 45° to 60° in relation to the tangent at the point where a radius passes through the position of the control pig 27. From the lowest ⅓ part 40 of the kick controller 25 is arranged one end of a second retracting spring 29 and the other end in a direction against the snell follower 11. This enables the kick controller 25 to be drawn to a start position, when no fish line is operating the equipment, against the snell follower 11.

A tin rod makes a hook storage container 30. This one is arranged as a prolongation of the hook holder 21 when it is in its stop position before it will be returned to its start position by the first retracting spring 13 shown in FIG. 3.

By the side of the guide 8 against the beam 10 and between first pivot 12 and sixth pivot 26, there is situated a projecting bracket 31. In its upper end is arranged a spring base 32 whereto a torsion spring 33 is arranged and can rotate around. One end of the torsion spring 33 is directed against the hook kicker 22 where it stands in a cleft 34 on the outer periphery of the hook kicker 22 to prevent the hook kicker 22 from moving against the hook store 30.

The other end of the torsion spring 33, nearest to the snell follower 11, will be affected by the speed bar 18 on a spot in its orbit between its start and stop position, in such a way that the first end of torsion spring 33 jumps out of the cleft 34 and the hook kicker 22 moves a short way against the hook store 30 fast, like a kick.

Figure 4:
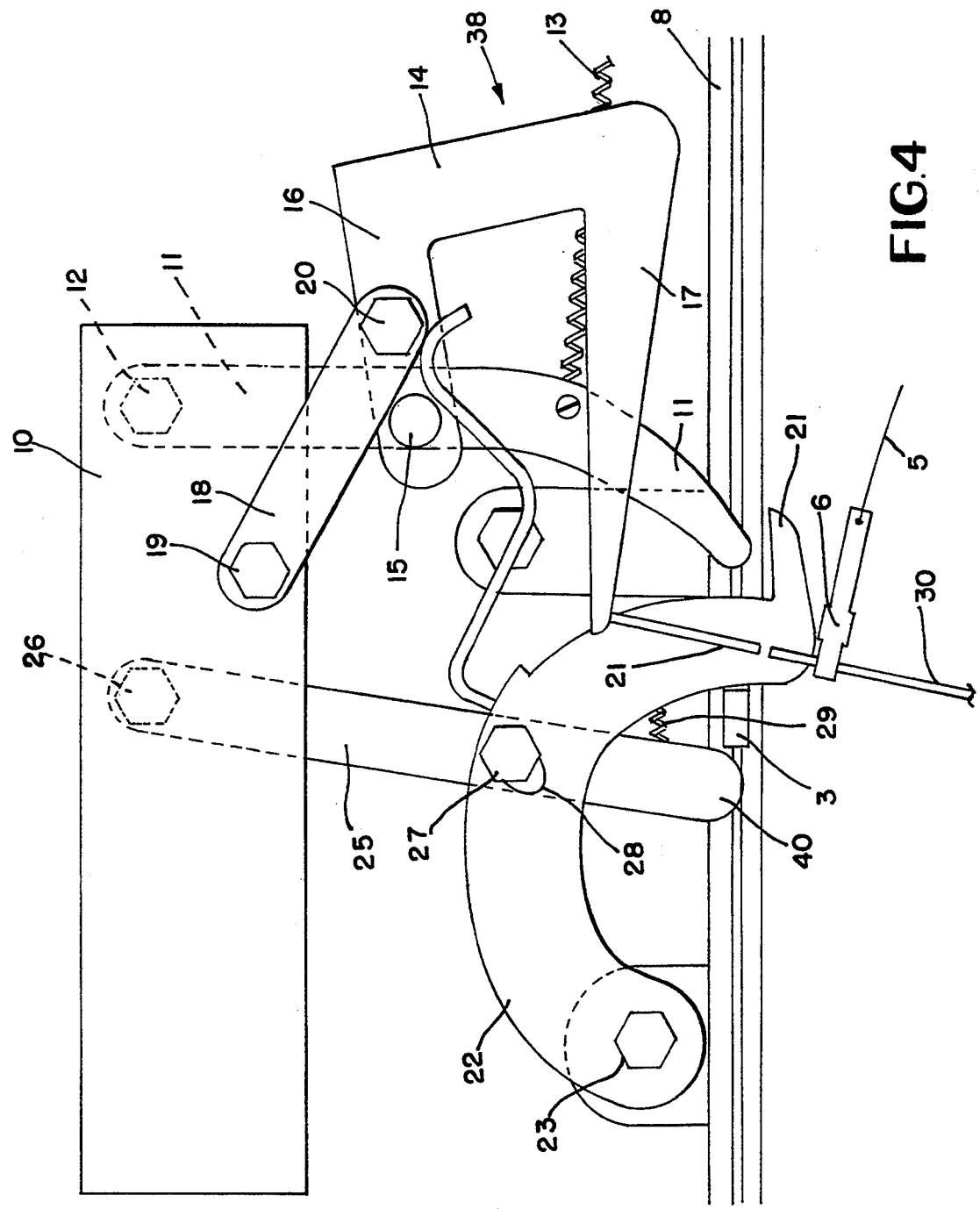
FIG. 4 shows the unhooking unit when the snell is unhooked from the main line and is on its way into the store.

The following will explain the function of the unhooking unit, and it starts with the situation where a swivel 3 is on its way from the right in FIG. 3 and contains a hook 6. In the left of FIG. 3, a swivel 3' is left without any hook 6. When the swivel 3' just before this point of time, reached the kick controller 25 after passing and operating the snell follower 11, the end of the torsion spring 33 is removed from the cleft 34 as shown in FIG. 4. By means of the control pig 27 and the control track 28, the swivel 3' which has operated the kick controller 25 will redraw the kick foot 24 upwards and lock it above the guide by the torsion spring 33 and the cleft 34.

When the swivel 3 moves against the snell follower 11 and causes it to move, the snell follower 11 via the second pivot 15 and the speed bar 18, rotates the unhooking bar 38 in the direction shown by the arrow A. The hook holder 21 moves down to the guide 8 and along the track 9 and then into the bottom bend of hook 6 and moves the hook 6 in the same direction as the swivel 3, but faster and such that the swivel 3 and the hook 6 will be released from each other by removing the hook 6 from the swivel's eye 4 as shown in phantom in FIG. 1. The hook 6 will at that moment be on the hook holder 21. In a fixed position for the unhooking bar 38 the speed bar 18 causes the torsion spring 33 to turn around the spring base 32 and move out of the cleft 34.

The hook kicker 22 will then because of the springload from the kick controller 25, move fast in a downward direction across the guide 8. At this moment the hook holder 21 is in position in the same direction and acts as a prolongation of the hook store 30. The kick foot 24 will then hit the hook 6 to kick it away from the hook holder 21 and guide it onto the hook store 30.

After this, the snell follower 11, the unhooking bar 38 and the speed bar 18 move back to the start positions shown in FIG. 3. The swivel 3 will now cause the kick controller 25 to strain up the hook kicker 22 as earlier described by means of the swivel 3'.

I claim:

1. A device for unhooking snell in an automatic longline-handling machine comprising:
   an elongated guide portion;
   a longitudinal and circular track formed in said guide portion, said track having a rectangular opening provided therein, wherein said track feeds a main line;
   at least one swivel member, each having an eye opening for connecting to respective hooks and snells, wherein the eyes run in the opening;
   a snell follower, first affected by said eye running in the opening, further controls an unhooking bar for separating the at least one swivel member from a respective hook; and
   a speed bar with a torsion spring which unlocks a strained hook kicker which guides the separated hook into a hook store.

2. The device for unhooking snells in an automatic longline-handling machine according to claim 1, wherein the guide is situated parallel to a beam which in its end nearest the spot where the main line is coming into the guide is rotatably arranged around a first pivot of a snell follower which is affected by the swivel and causes a second pivot to be rotatable around the unhooking bar and moves along the track and by means of a hook holder releases and stores the hook.

3. The device for unhooking snell in an automatic longline-handling machine according to claims 1 or 2, wherein in one end of the beam rotatable around a third pivot is arranged a speed bar which in its other end is rotatable via a fourth pivot connected to a first part of bar at the unhooking bar when the other of the speed arm when the snapholder keeps the hook affects one end of a torsion spring which is arranged to be released from a cleft on a hook kicker and a kick foot on the hook kicker guides the hook at the hook holder into a hook store.

4. The device for unhooking snell in an automatic longline-handling machine according to claim 3, wherein the swivels after passing the snell follower will affect a kick controller to pivot about itself on a control pig situated in a control track to strain the hook kicker such that the torsion spring goes into the cleft.

5. A device for unhooking snell for ma fishing line comprising:
   at least one swivel member including
      a sleeve rotatable about the line's longitudinal axis but substantially restricted in longitudinal movement therealong,
      an eye formed in said at least one swivel, the center axis of the eye extending parallel with the line;
   a crook-shaped hook releasably hooked at one end thereof into said eye and having said snell at an opposing end thereof;
   a stationary guide rail including
      a longitudinal groove portion having a cross-section corresponding to the sleeve of said at least one swivel member,
      an opening extending along the length of the longitudinal groove for positioning the eye of said swivel outside of the longitudinal groove portion;
   a swivel follower movably mounted with respect to said guide rail, said swivel follower including
      a first section of influence movable along a first section of the longitudinal groove in the path of said at least one swivel and actuable by said at least one swivel when said at least one swivel is moved by the line along this section of the longitudinal groove;
   a hook remover movably mounted with respect to said stationary guide rail and engageable with the hook to move the hook parallel to the longitudinal groove in the line's direction of travel;
   a first motion conversion mechanism for connecting the swivel follower with the hook remover, thereby causing the hook remover to be moved faster than the first section of influence when the line is moved in the groove and said at least one swivel influences the swivel follower, thus causing the hook and eye to be separated when the swivel follower has been moved along the first section of said longitudinal groove.

6. The device according to claim 5, wherein said longitudinal groove extends linearly, the swivel follower and the hook remover are rotatably mounted with respect to the stationary guide rail, and said first motion conversion mechanism includes a velocity arm rotatably connected with a stationary part of an unhooking arm, wherein the hooking arm carries the hook remover and is linked to the swivel follower and the velocity arm.

7. The device according to claim 5, further comprising means for detaching hooks from the hook remover and placement of detached hooks in a store.

8. The device according to claim 7, wherein said means for detaching hooks includes a control movably mounted with respect to said stationary guide rail, a second section of influence movable along a second section of the longitudinal groove in the path of travel of said at least one swivel member, the control arm being influenced by said at least one swivel member when said at least one swivel member is moved by the line along the second section of the longitudinal groove, a kicking foot movably mounted with respect to the stationary guide rail and engageable with the hook to lead the hook away from the hook remover, and a second motion conversion mechanism for connecting the control arm with the kicking foot, thereby causing the kicking foot to be moved when said at least one swivel influences the control arm.

9. The device according to claim 8, wherein the control arm and the kicking foot are rotatably mounted with respect to the stationary guide rails, and the second motion conversion mechanism includes a hook kicker which carries the kicking foot, a bending spring releasably engaged with the hook kicker and securing the hook kicker is an initial position in which the kicking foot is ready to kick the hook off the hook remover, a spring for biasing the kicking foot towards the hook, and an axle linking the control arm and the hook kicker, the engagement of the bending spring being released when the bending spring is influenced by a section of the first motion conversion mechanism when the hook remover is positioned adjacent to the store.

* * * * *